(No Model.)

G. W. KING.
LATCH MECHANISM FOR DIPPERS OR SHOVELS OF EXCAVATING MACHINES.

No. 549,726. Patented Nov. 12, 1895.

Witnesses.
E. B. Gilchrist

Inventor.
George W. King
By Leggett & Leggett
his Attorneys.

UNITED STATES PATENT OFFICE.

GEORGE W. KING, OF MARION, OHIO.

LATCH MECHANISM FOR DIPPERS OR SHOVELS OF EXCAVATING-MACHINES.

SPECIFICATION forming part of Letters Patent No. 549,726, dated November 12, 1895.

Application filed January 13, 1894. Serial No. 496,771. (No model.)

*To all whom it may concern:*

Be it known that I, GEORGE W. KING, of Marion, in the county of Marion and State of Ohio, have invented certain new and useful Improvements in Latch Mechanism for the Dippers or Shovels of Excavating-Machines; and I do hereby declare the following to be a full, clear, and exact description of the invention, such as will enable others skilled in the art to which it pertains to make and use the same.

My invention relates to improvements in latch mechanism for the dippers or shovels of dredging or excavating machines, the object being to produce mechanism of the variety indicated that is susceptible of nice adjustment, so that the wear is reduced to a minimum and so that the latch shall catch hold of the latch-plate just enough to hold the load.

With this object in view and to the end of attaining simplicity and durability my invention consists in certain features of construction and in combinations of parts, hereinafter described, and pointed out in the claim.

Figure 1:
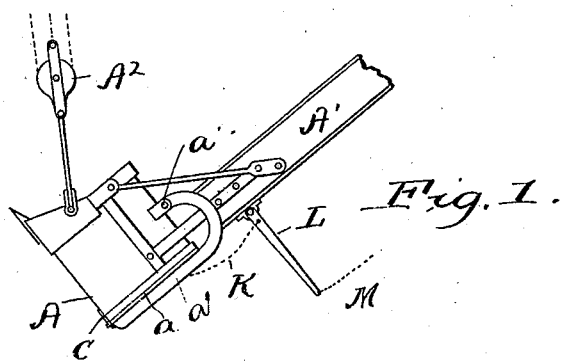
Figure 2:
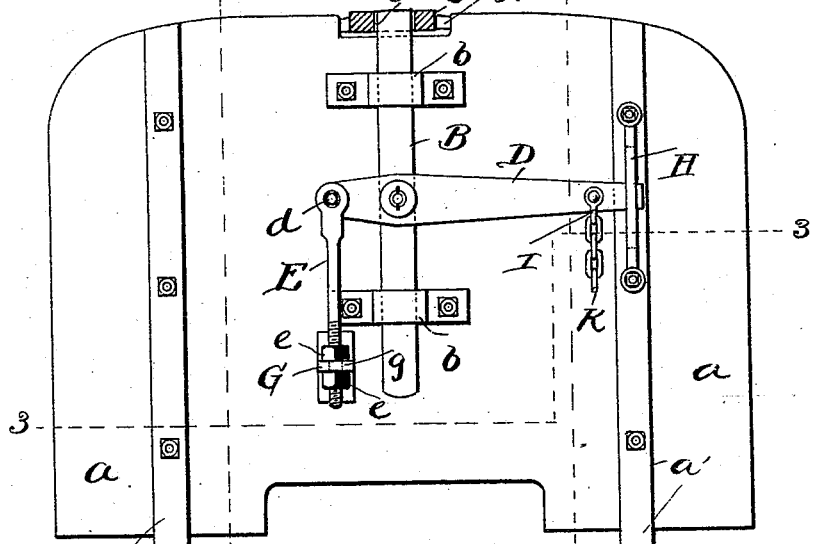
Figure 3:
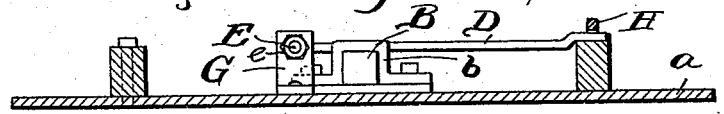
Figure 4:
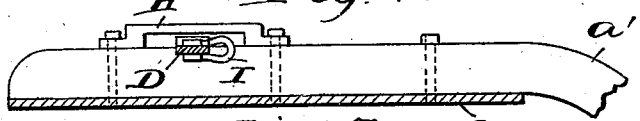
Figure 5:
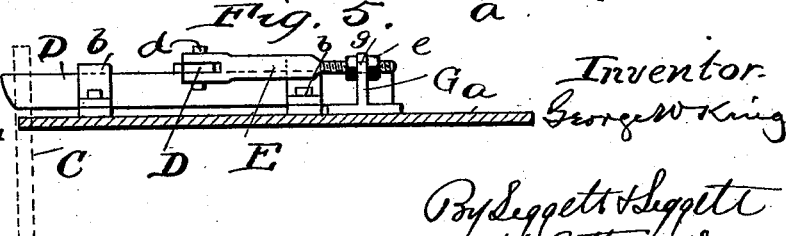

In the accompanying drawings, Figure 1 is a side elevation of an excavating bucket or dipper provided with latch mechanism embodying my invention. Fig. 2 is an enlarged bottom plan of the dipper or shovel, portions being broken away and in section to more clearly show the construction. Figs. 3, 4, and 5 are sections of the shovel or dipper bottom on lines 3 3, 4 4, and 5 5, Fig. 2, respectively.

Referring to the drawings, A represents the dipper or shovel, A' its arm or handle, and $A^2$ the tackle from which it is suspended, said arm and tackle being operatively connected in any approved manner (not shown) with suitable machinery for operating the shovel or dipper.

The subject-matter claimed in this application involves merely improved mechanism for locking the hinged bottom of the dipper or shovel and the means employed for actuating the latch of the locking mechanism to unlock, and, referring again to the drawings, $a$ designates the shovel or dipper bottom that is hinged to the dipper or shovel at the side adjacent to the shovel or dipper arm or handle by means of suitable hinges $a'$. Located preferably centrally and arranged transversely of the under side of the dipper or shovel bottom is the latch B, that is adapted to reciprocate endwise in suitable straps, staples, or guides $b$, suitably secured to the shovel or dipper bottom, the latch being adapted to engage a hole C' in latch-plate C, that is suitably secured to the front side of the dipper or shovel, and thereby lock the hinged bottom in its closed position. The latch is retained in its locking position by gravity, and a spring (not shown) might also be employed to retain the latch in such position. The latch is actuated to unlock by means of a lever D, that is operatively connected with the latch in any suitable manner and is fulcrumed at one end, as at $d$, preferably to an adjustable eyebolt E, the shank whereof engages a hole $g$ in a lug, flange, or member G, projecting from and rigid with the shovel or dipper bottom, said bolt, and consequently the fulcrum of the latch-operating lever, being secured in the desired adjustment by means of nuts $e e$, mounted upon the bolt at opposite sides of member G, respectively. The point of connection of lever D with the latch is preferably near the fulcrum of said lever, as shown. The other or free end of lever D is confined within a staple H, suitably secured to the shovel or dipper bottom, the size and location of said staple being preferably such that when the latch is in its locking position the latch-operating lever shall engage the one end of the staple and when the latch is in its unlocking position said lever shall engage the other end of the staple—that is, the ends of the staple form stops for limiting the movement of the lever in opposite directions, respectively.

The latch-operating lever, preferably at a point between the latch and staple H and near the latter, is provided with a clevis I, that, by means of a chain or suitable connection K, is connected with a lever L, fulcrumed to the arm or handle of the shovel or dipper and operatively connected to the operating rope or cable M, that leads to within convenient reach of the operator and by pulling upon which rope or cable the operator causes the latch to be actuated to unlock the shovel or dipper bottom and permit the bottom to open.

The adjustability of the fulcrum of the latch constitutes a feature of vast importance, for by virtue of this feature the latch can be adjusted so as to reduce the wear to a minimum, so that the latch shall just catch hold of latch-plate C sufficiently to retain the shovel or dipper bottom locked in its closed position.

The importance of the feature just referred to will be more readily realized when it is considered that it is difficult to dump if the latch is permitted to take too great hold and that the shovel or dipper is liable to dump before the operator is ready for it if the latch has not sufficient hold.

What I claim is—

In latch-mechanism for locking the hinged bottom of a dredging or excavating-shovel or dipper in its closed position, the combination of a locking-latch slidably supported from and arranged transversely of the under side of the shovel or dipper-bottom, a lug, flange or member projecting from the under side of said bottom and provided with a hole or perforation, an eye-bolt the shank whereof engages said perforation, nuts mounted upon the bolt at opposite sides, respectively, of the aforesaid lug, flange or projecting-member, a lever fulcrumed to said bolt and operatively connected with the latch, and suitable means for operating the latch-operating-lever, substantially as set forth.

In testimony whereof I sign this specification, in the presence of two witnesses, this 1st day of November, 1893.

GEORGE W. KING.

Witnesses:
C. H. DORER,
ROLLA C. PERRY.